(12) United States Patent
Losq

(10) Patent No.: US 7,052,279 B1
(45) Date of Patent: May 30, 2006

(54) TEN-FRAME SUBTRACTION SYSTEM

(76) Inventor: Christine Saal Losq, 4017 Page Mill Rd., Los Altos, CA (US) 94022

( * ) Notice: Subject to any disclaimer, the term of this patent is extended or adjusted under 35 U.S.C. 154(b) by 166 days.

(21) Appl. No.: 10/721,601

(22) Filed: Nov. 25, 2003

Related U.S. Application Data

(60) Provisional application No. 60/430,012, filed on Nov. 27, 2002.

(51) Int. Cl.
*G09B 19/02* (2006.01)
(52) U.S. Cl. .................................. 434/191; 434/188
(58) Field of Classification Search ................ 434/188, 434/191, 195, 196, 198, 199, 205; 273/302
See application file for complete search history.

(56) References Cited

U.S. PATENT DOCUMENTS

| | | | | |
|---|---|---|---|---|
| 367,223 | A * | 7/1887 | Moody | 283/44 |
| 3,001,301 | A * | 9/1961 | Carl | 434/205 |
| 3,061,947 | A * | 11/1962 | Faudree | 434/205 |
| 3,229,388 | A * | 1/1966 | Smith | 434/195 |
| 3,410,002 | A * | 11/1968 | Mulholland et al. | 434/195 |
| 3,469,325 | A * | 9/1969 | Greenberg | 434/167 |
| 4,177,581 | A * | 12/1979 | Walker | 434/200 |
| 4,548,585 | A | 10/1985 | Kelly | |
| 5,366,378 | A | 11/1994 | Johannsen et al. | |
| 5,529,497 | A * | 6/1996 | Bigold | 434/191 |
| 6,089,871 | A | 7/2000 | Jaffe | |
| 6,375,468 | B1 | 4/2002 | Sundararajan | |
| 6,447,300 | B1 | 9/2002 | Greenberg | |
| 6,755,658 | B1 * | 6/2004 | Frieman | 434/191 |
| 6,758,675 | B1 * | 7/2004 | Karabaic | 434/189 |

OTHER PUBLICATIONS

Labinowicz, Ed, Learning from Children: New Beginnings for Teaching Numercial Thinking: A Piagetian Approach, 1985, 10 pages, Addison-Wesley Publishing Company, Menlo Park, CA, U.S.A.

Kanter, Patsy F. and Janet G. Gillespie, Every Day Counts, 1992, 19 pages, D.C. Heath and Company, Lexington, Massachusetts, U.S.A.

Mathland Grade 1 Guidebook, 1995, 1 page, Creative Publications, U.S.A.

Losq, Christine, Math Zones Level A: Addition and Subtraction, 1998, 13 pages, Great Source Education Group, Inc., U.S.A.

(Continued)

*Primary Examiner*—Kurt Fernstrom
(74) *Attorney, Agent, or Firm*—Law Office of Karen Dana Oster, LLC

(57) ABSTRACT

A ten-frame subtraction system for teaching subtraction skills of the present invention preferably includes at least one card and at least one tile. The card has a positive numerical representation thereon represented by a corresponding quantity of graphical representations which are arranged in a predetermined arrangement. The tile has a negative numerical representation thereon represented by a corresponding quantity of cross-outs that are arranged in the predetermined arrangement. The tile is designed to interact with the card for teaching subtraction skills. Preferably the graphical representations remain visible through the tile if they are not covered by the cross-outs when the tile interacts with the card. The present invention is also directed to a method for using the ten-frame subtraction system to teach subtraction skills.

24 Claims, 11 Drawing Sheets

OTHER PUBLICATIONS

Whitnack, Joy W. et al., Starting off the School Year with Opportunities for All: Supporting First Graders' Development of Number Sense, Teaching Children Mathematics, Sep. 2002, 6 pages, NCTM, U.S.A.

Losq, Christine, Developing Number Sense and Arithmetic Skills with Ten-Frame Dot Cards: Activities for Kindergarten and Grade 1, at least as early as 1996, 7 pages, U.S.A.

* cited by examiner

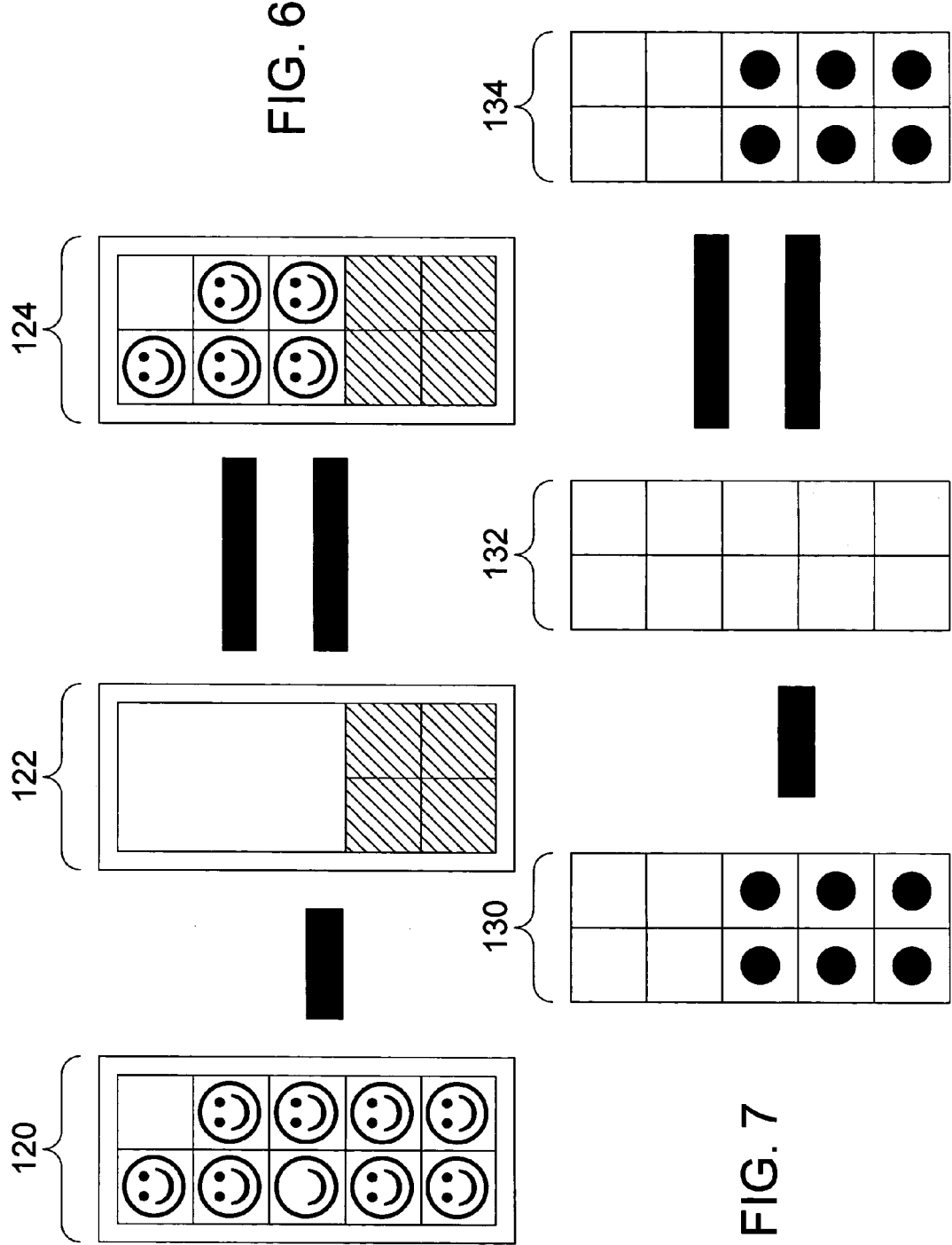

TEN-FRAME SUBTRACTION SYSTEM

The present application is an application claiming the benefit under 35 USC Section 119(e) of U.S. Provisional Patent Application Ser. No. 60/430,012, filed Nov. 27, 2002. The present application is based on and claims priority from this application, the disclosure of which is hereby expressly incorporated herein by reference.

BACKGROUND OF INVENTION

The present invention is directed to a system for developing number sense and arithmetic skills, and specifically to a ten-frame subtraction system for teaching subtraction skills.

The present invention builds on a ten-frame dot card system developed by the inventor of the present invention. The ten-frame dot card system includes ten-frame cards 100 (hereinafter "cards") that show a positive numerical representation of the numbers 0–10 in two-by-two arrays of "dots" framed in ten windows. As shown in FIG. 1, each card 100 has a combination of "dots" 102 and "empties" 104. The number of dots 102 shown on the card 100 is the number that the card 100 represents. Because the dots 102 and empties 104 are framed in ten (10) windows, each number is shown in relation to ten (10) it helps to reinforce concepts of place value, necessary for basic arithmetic. These cards 100 are used to model numbers for place value and computation. The system sometimes includes a carrier that has pockets for each number 0–10 in which the cards 100 are generally stored.

FIG. 1 shows an exemplary embodiment of the ten-frame dot card system. Although only one set of cards 100 is shown, for each number 0–10 (each having the appropriate number of dots 102) there may be multiple cards 100. For example, in one preferred embodiment the ten-frame dot card system would include two (2) copies of each card 100 representing 0–9 and ten (10) copies of the card 100 representing 10, for a total of thirty (30) cards 100. The cards 100 representing the number 10 may be a different color than the cards 100 representing the numbers 0–9. If the system includes a carrier, multiple cards 100 representing the same number could be stored in the pocket imprinted with the corresponding numeral.

The term "card 100" is used throughout this specification to describe a device upon which dots 102 may be imprinted, marked, etched, or otherwise represented. It should be noted that the cards 100 might be plastic or heavy paper cards, plastic tiles, coins, chips, pieces of paper, pages in a book, or any other device that can be imprinted or marked.

The term "dot 102" is used throughout this specification to describe graphical representations or markings on the cards 100, each dot 102 representing one numerical unit. It should be noted that the dots 102 may be replaced with other graphical representations or markings such as lines, hatch marks, stars, smiley faces, flowers, pictures of animals or characters, letters or numbers, or any other marking similarly meant to designate one numerical unit.

The term "window" is used throughout this specification to describe an empty space. Although the shown embodiments have lines outlining the windows, these lines are optional.

The ten-frame dot card system shown in FIG. 1 was shown and described in the article, *Developing Number Sense and Arithmetic Skills with Ten-Frame Dot Cards* written by the inventor of the present invention as well as other publications by the inventor. The cards 100 used in the ten-frame dot card system could be used for many activities including putting numbers in order and number flash (in which children quickly count the dots 102 as they are shown a "flash"). Other activities are described in Success with Math Coach publications (also authored by the inventor of the present invention) including *Ten-Frame Games and Activities, Dot Card Tutorial, Add and Subtract Volume 1: Basic Facts, Ten-Frame Activities for Arithmetic Readiness*, and *Place Value Volume 1: Whole Numbers*. These publications were primarily focused on counting and addition.

An example of how the ten-frame dot card system was used to teach subtraction is shown in *Add and Subtract Volume 1: Basic Facts*. The method for teaching subtraction was a write-out method that involved crossing out dots 102 on the card 100 to "take away" the designated number of dots 102. The number of dots 102 left represents the solution to the equation. A first example of how this works is the equation "5−2=3." For this first equation the user would choose a card 100 with five (5) dots 102 and then cross out two (2) dots 102. The three (3) dots 102 remaining uncrossed would represent the solution to the equation which, in this case would be "3." A second example of how this works is the equation "6−6=0." For this second equation the user would choose a card 100 with six (6) dots 102 and then cross out six (6) dots 102. The zero (0) dots 102 remaining uncrossed would represent the solution to the equation which, in this case would be "0." A third example of how this works is the equation "8−0=8." For this third equation the user would choose a card 100 with eight (8) dots 102 and then cross out zero (0) dots 102. The eight (8) dots 102 remaining uncrossed would represent the solution to the equation which, in this case would be "8."

There were a variety of problems with the write-out method. First, it involves using a writing instrument. A user must first obtain a writing instrument which he may not have readily available. It is also easy to loose a writing instrument. For younger users, the parent or teacher may also want to avoid the use of writing instruments which can be distracting and messy. If the writing instrument is permanent in nature (e.g. the writing cannot be removed once it is on the card), the cards will not be suitable for reuse. Even pencil markings tend to be impossible to completely erased. The use of non-permanent markers is also problematic. First, the cards must be coated or covered with a wipable surface. Second, it requires special non-permanent markers that tend to be expensive. Third, non-permanent markers tend to dry out. Fourth, the use of a non-permanent marker requires an eraser or cloth, which is another part to lose. Fifth, the ink on the surface of a card that has been written on tends to smear easily on hands of the user as well as any other item or surface it touch touches. Sixth, for some students, the write-out method makes it impossible for them to review all parts of the equation because they can see only the total or the result at any given time.

Another method of teaching subtraction using "Totally Ten Grids" (2×5 grids) is described in *Every Day Counts* by Patsy F. Kanter. In this reference blue and red dot stickers are used to populate the grids. One of the exercises is set forth as follows: "When there are more than five dots in the Grid, ask children to tell how many blue and red dots make the total. If you ask how many are left if we take away the blue ones and how many are left if we take away the red ones, some children may come to see that if you know 5 and 2 are 7, then 7 take away 2 will always leave the 5." Subtraction is taught, therefore, using the different colored dots. There were a variety of problems with this method. First, it involves using a bunch of little dot stickers. If the user runs out of dot stickers, the product is no longer useful. It is also easy to loose little dot stickers. For younger users, the parent or teacher may also want to avoid the use of little dot stickers which can be distracting as the children stick them all over everything except the grids. If the dot stickers are permanent in nature (e.g. the stickers cannot be removed once they are on the card), the cards will not be suitable for reuse. Further, the arrangement of the dots does not encourage children to learn other ways to subtract from 7 such as 7–3, 7–4, 7–1, and 7–6. Finally, dot color coding limits the educational value of this model.

BRIEF SUMMARY OF THE INVENTION

The present invention is directed to a system for developing number sense, place value, and arithmetic skills, and specifically to a ten-frame subtraction system for teaching subtraction skills.

A ten-frame subtraction system for teaching subtraction skills of the present invention preferably includes at least one card and at least one tile. The card has a positive numerical representation thereon represented by a corresponding quantity of graphical representations which are arranged in a predetermined arrangement. The tile has a negative numerical representation thereon represented by a corresponding quantity of cross-outs that are arranged in the predetermined arrangement. The tile is designed to interact with the card for teaching subtraction skills. Preferably the graphical representations remain visible through the tile if they are not covered by the cross-outs when the tile interacts with the card.

The present invention is also directed to a method for using the ten-frame subtraction system to teach subtraction skills.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
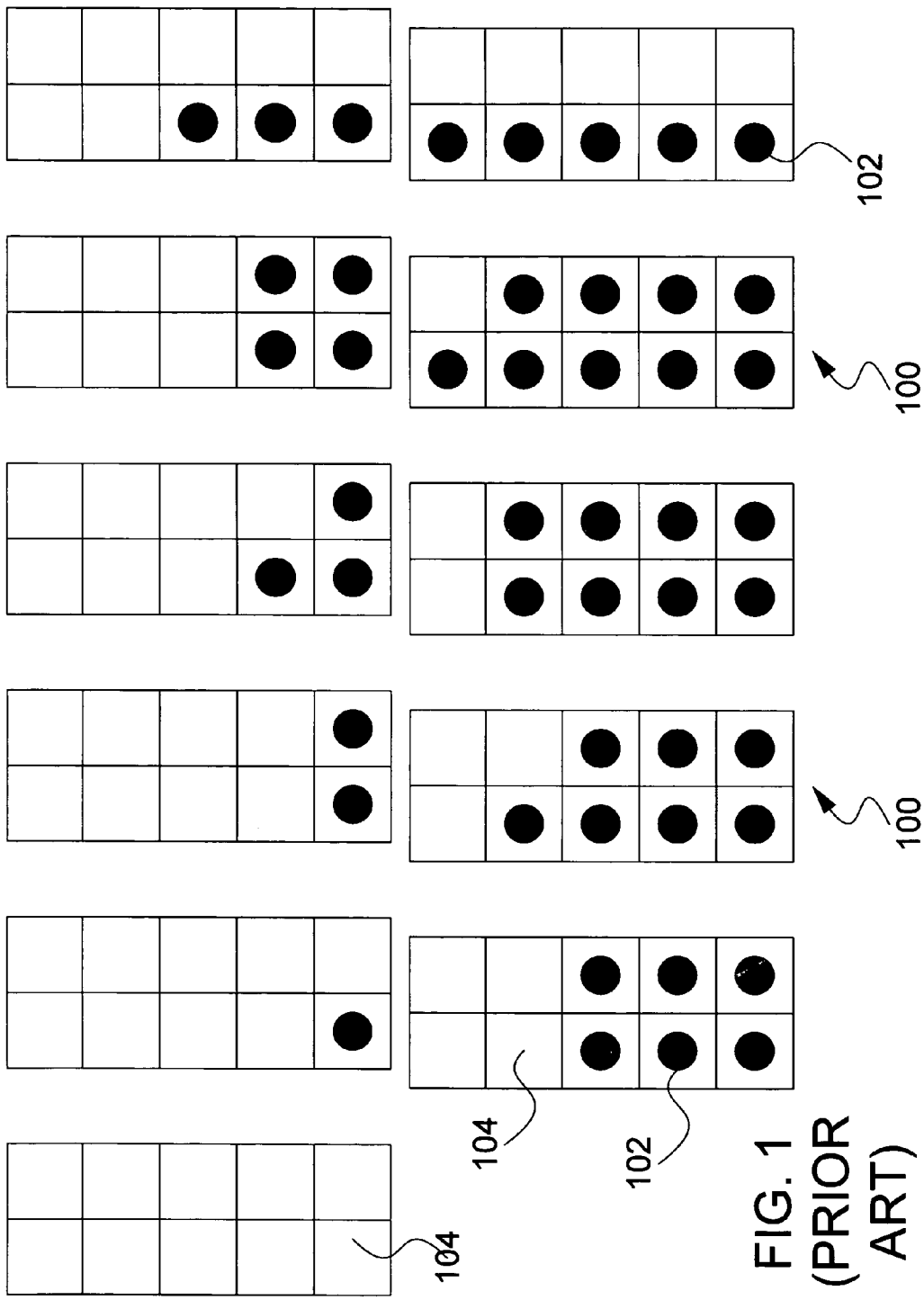
FIG. 1 is a front view of a prior art set of ten cards representing 0–10 of a ten-frame dot card system.

The present invention is directed to a system for developing number sense, place value, and arithmetic skills, and specifically to a ten-frame subtraction system for teaching subtraction skills. This is accomplished using a set of ten-frame take-away tiles 110 (hereinafter "tiles 110") such as that shown in FIG. 2. The tiles 110 each have a number of "take-aways" or "cross-outs" (hereinafter "cross-outs 112") equal to the number 0–10 (although the 0 tile 110 is optional) that it is representing. In other words, the tiles 110 each have a negative numerical representation thereon. The remaining frames or windows on each tile 110 are "empties" 114. The tiles 110 are meant to interact with the cards 100 of the ten-frame dot card system.

Unlike the prior art method for teaching subtraction which involved crossing out dots 102 on the card 100 to "take away" the designated number of dots 102, the present invention may be used by selecting the appropriate tile 110 and placing it over the card 100 or otherwise allowing the tile 110 and card 100 to interact. This interaction feature allows a user to be able to see the original number from which to be subtracted, the take-away number, and the result separately as well as interactively. Further, the user can put the tile 110 and card 100 together and take them apart repeatedly to truly learn the interaction. One advantage of this system is that it prevents damage to the cards 100 caused by writing and erasing on the cards 100 itself. Another advantage of the system is that it can be used anywhere. For example, in a moving vehicle, a bumpy road might prevent a user from writing so the prior art method would be impossible to use.

The term "tile" is used throughout this specification to describe a device upon which cross-outs 112 may be imprinted, marked, etched, attached, or otherwise represented. It should be noted that the tiles 110 are preferably at least partially transparent, have cut-out windows, or are otherwise at least partially see-through. It should be noted that the tiles 110 may be plastic tile, cards, coins, chips, pieces of paper, pages in a book, or any other device that can be imprinted or marked.

It should be noted that an exemplary set of the ten-frame take-away tiles 110 may include multiple tiles 110 representing the same number. For example, in one preferred embodiment the ten-frame subtraction system would include two (2) copies of each tile 110 representing 0–9 and ten (10) copies of the tile 110 representing 10, for a total of thirty (30) tiles 110. As noted, the 0 tile 110 is optional. The tiles 110 representing the number 10 may be a different color or may be otherwise differentiated from the tiles 110 representing the numbers 0–9.

Figure 3:
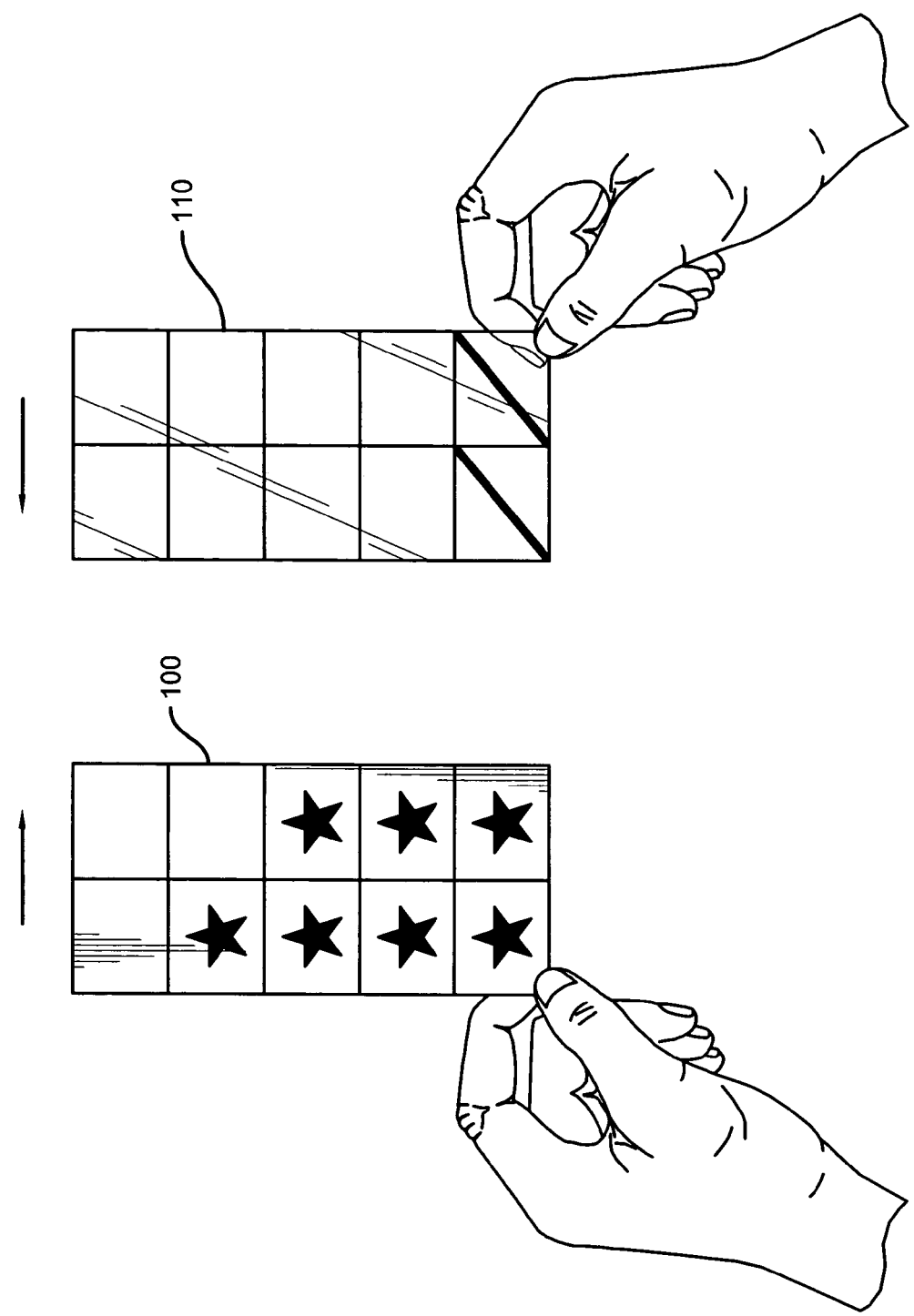
FIG. 3 is a front view of a card of a ten-frame dot card system and a tile of a ten-frame subtraction system of the present invention, the card and tile being held apart.
Figure 4:
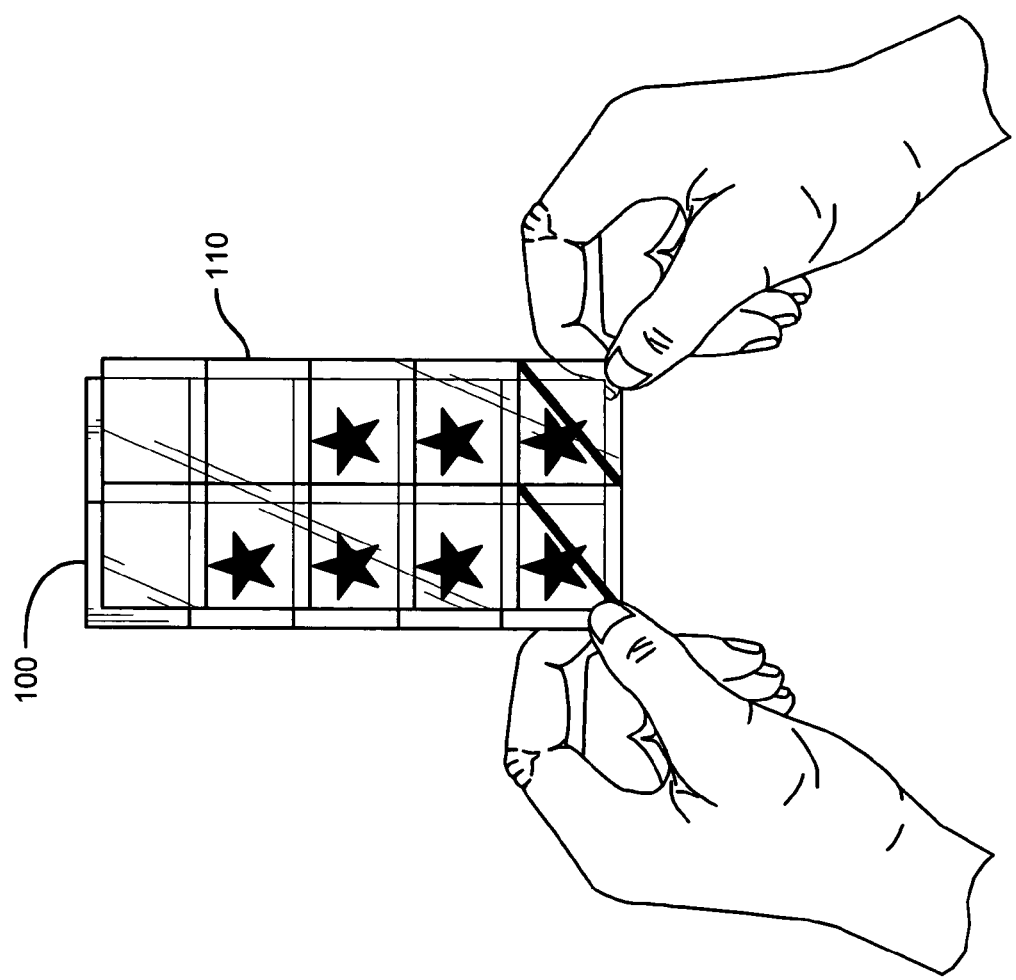
FIG. 4 is a front view of a card of a ten-frame dot card system and a tile of a ten-frame subtraction system of the present invention, the card and tile being held in an overlapping relationship.

FIGS. 3 and 4 show an exemplary embodiment of how the present invention may be used. As shown, in use, the user could hold a card 100 (shown as a 7 card 100 with seven (7) star marking dots 102) in one hand a tile 110 (shown as a 2 tile 110 with two (2) cross-outs 112) in the other hand. The tile 110 is then brought into an overlapping relationship the card 100. Because the tile 110 is at least partially transparent, the user can see the seven (7) star marking dots 102 through the tile 110. The user is also able to see that the two (2) cross-outs 112 cover two (2) of the star marking dots 102. The user is very graphically presented with the solution that there are five (5) star marking dots 102 that remain un-crossed-out. It should be noted that the present invention could be used by laying the cards on a flat surface.

Figure 2:
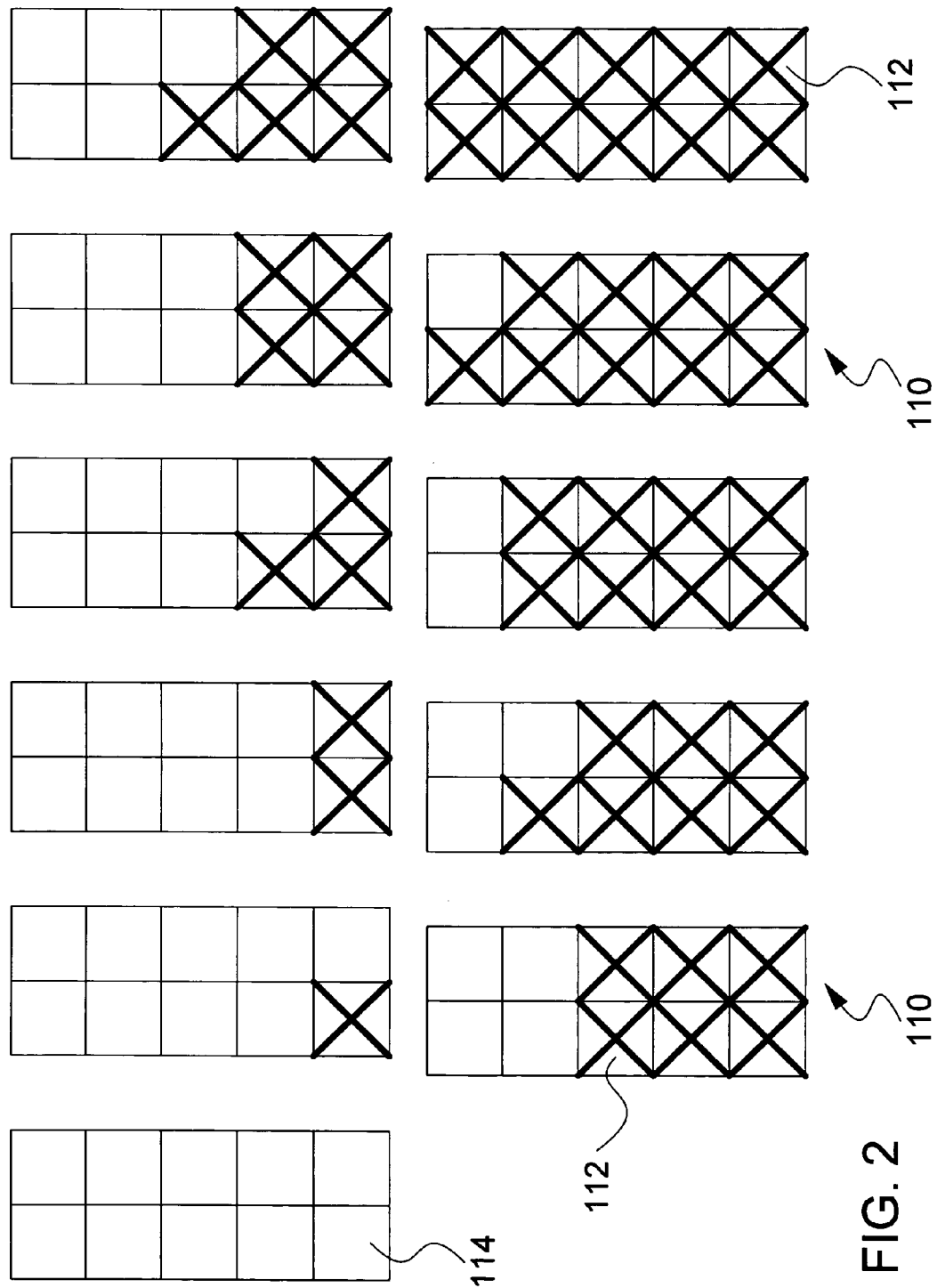
FIG. 2 is a front view of a set of ten exemplary ten-frame take-away tiles of an exemplary ten-frame subtraction system of the present invention.
Figure 5:
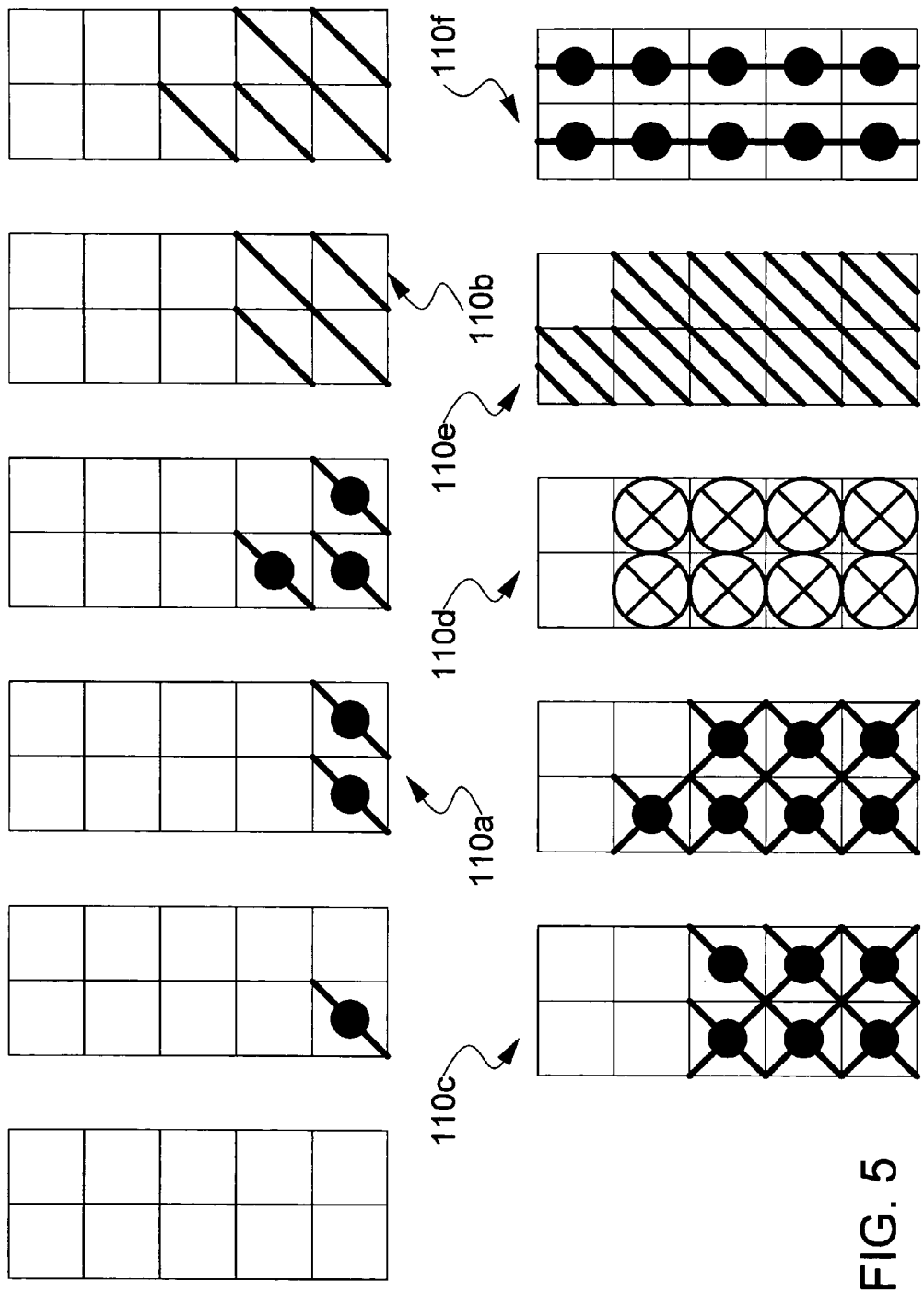
FIG. 5 is a front view of a set of ten exemplary ten-frame take-away tiles, the 0–3 tiles showing a dot with a single "/" cross-out, the 4 and 5 tiles showing a single "/" cross-out, the 6 and 7 tiles showing a dot with a "X" cross-out, the 8 tile showing a "X" cross-out with a circle around the "X", the 9 tile showing a plurality of diagonal lines cross-out, and the 10 tile showing a dot with a single "|" (vertical line) cross-out.
Figure 12:
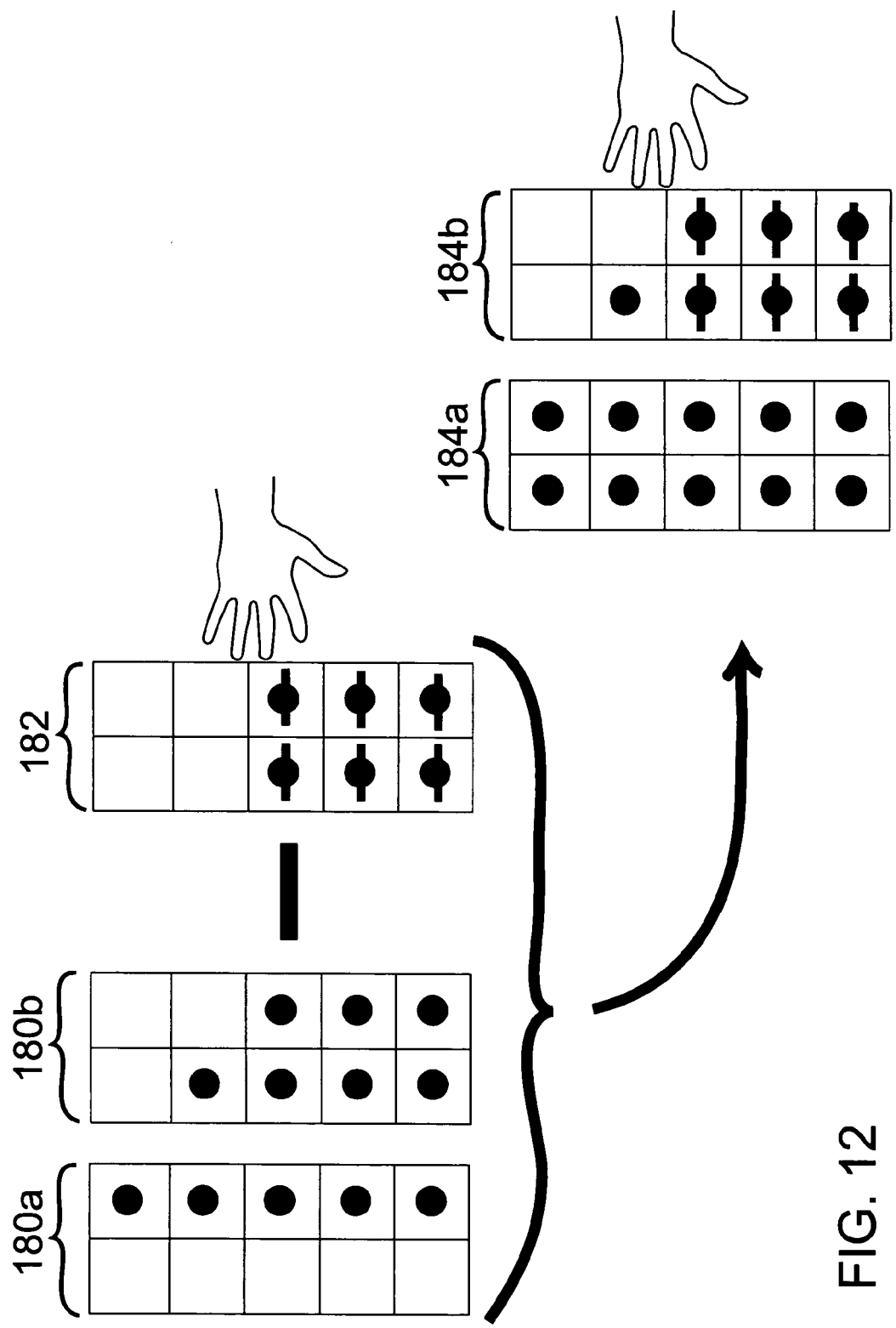
FIG. 12 is a front view of the equation "17–6=11" being represented by a 10 card and a 7 card of a ten-frame dot card system, a 6 tile of a ten-frame subtraction system of the present invention, and the 6 tile overlapping the 7 card to show eleven (11) non-crossed-out dots.
Figure 1:
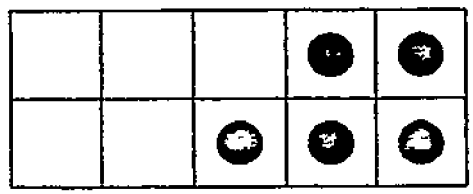
Figure 1:
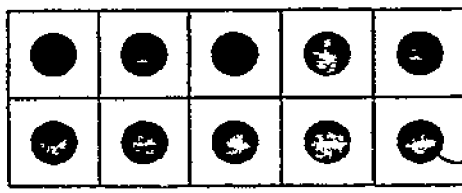
Figure 1:
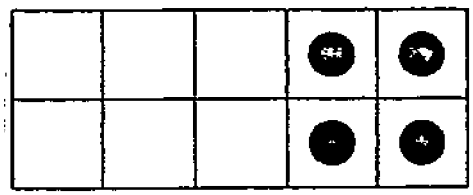
Figure 1:
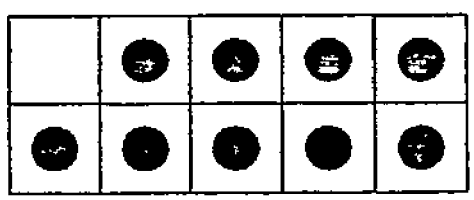
Figure 1:
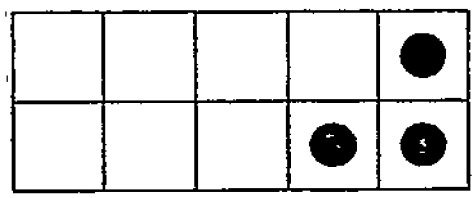
Figure 1:
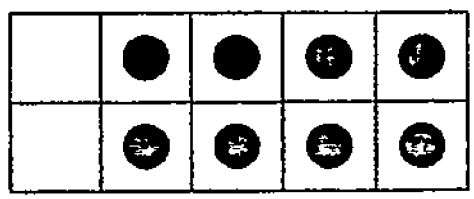
Figure 1:
Figure 1:
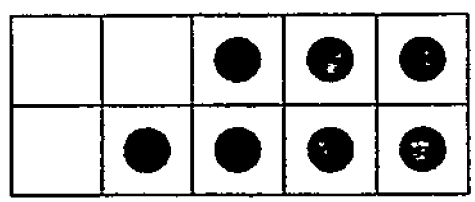
Figure 1:
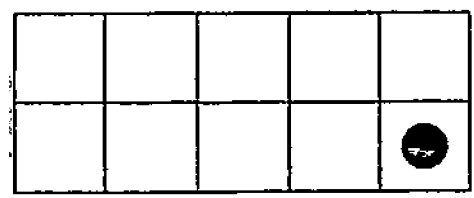
Figure 1:
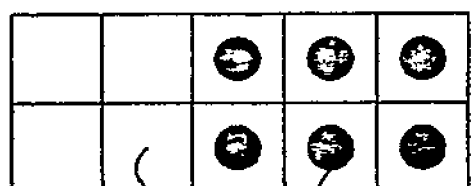
Figure 1:

As set forth above, each tile 110 has a numerical representation represented by the number of cross-outs 112. The term "cross-out" is used throughout this specification to describe markings on the tiles 110, each cross-out 112 representing the elimination of one numerical unit. It should be noted that the shown cross-outs 112 are meant to be exemplary. For example, in addition to the plain "X" cross-outs 112 shown in FIG. 2, FIG. 5 shows alternative exemplary cross-outs. For example, the 0–3 tiles 110a show a dot with a single "/" cross-out, the 4 and 5 tiles 110b show a single "/" cross-out, the 6 and 7 tiles 110c show a dot with a "X" cross-out, the 8 tile 110d shows a "X" cross-out with a circle around the "X", the 9 tile 110e shows a plurality of diagonal lines cross-out, and the 10 tile 110f shows a dot with a single "|" (vertical line) cross-out. A dot with a horizontal line cross-out is shown in FIG. 12. Alternative embodiments may have or may not have dots in them. The dots in the cross-out 112 may also be replaced with other graphical representations or markings such as lines, hatch marks, stars, flowers, smiley faces, pictures of animals or characters, letters or numbers, or any other marking similarly meant to designate one numerical unit. The cross-out 112 may also be a completely opaque covering or a transparent covering of a different color.

As mentioned above, the tiles 110 are meant to interact with the cards 100 of the ten-frame dot card system. The term "interact" is used to mean that tiles 110 act upon, or change the cards 100 when they are used together. For this purpose, the tiles 110 are preferably clear, transparent, see-through, cut-outs (such as a die-cut tile 110 with the cross-outs 112 left in place as shown in FIG. 6), or of another design that allows interaction between the tiles 110 and the cards 100.

Another alternative embodiment would take advantage of color blending. The color-blending embodiment would use cards 100 with dots 102 represented in a first "primary" color (e.g. yellow) and the background in a "blended" color (e.g. green). The color-blending embodiment could use tiles 110 with cross-outs 112 (most likely having a shape similar to the dots 102) represented in a second "primary" color (e.g. blue). When the tile 110 is placed over the card 100, the color of the dots 102 and the color of the cross-outs 112 would blend to the exact color of the background such that the subtracted dots 102 would appear to disappear. An alternative embodiment of the color-blending embodiment could also have the entire window of the cross-out presented in a second color. Yet another alternative embodiment of the color-blending embodiment could also have a traditional cross-out marking (e.g. similar to those shown in FIG. 5).

Yet another alternative embodiment would have moveable "cross-outs." This embodiment could be implemented similarly to a travel bingo game with slideable "cross-outs." Once the appropriate number of cross-outs had been slid into position, the user would use this alternative embodiment in a manner similar to the embodiments discussed elsewhere in this specification. Yet another alternative embodiment would have blank tiles (similar to a 0 tile) upon which the user could draw "cross-outs" with either permanent or removable means. Once the appropriate number of cross-outs had been drawn on the blank tiles, the user would use this alternative embodiment in a manner similar to the embodiments discussed elsewhere in this specification.

Figures 6, 7:
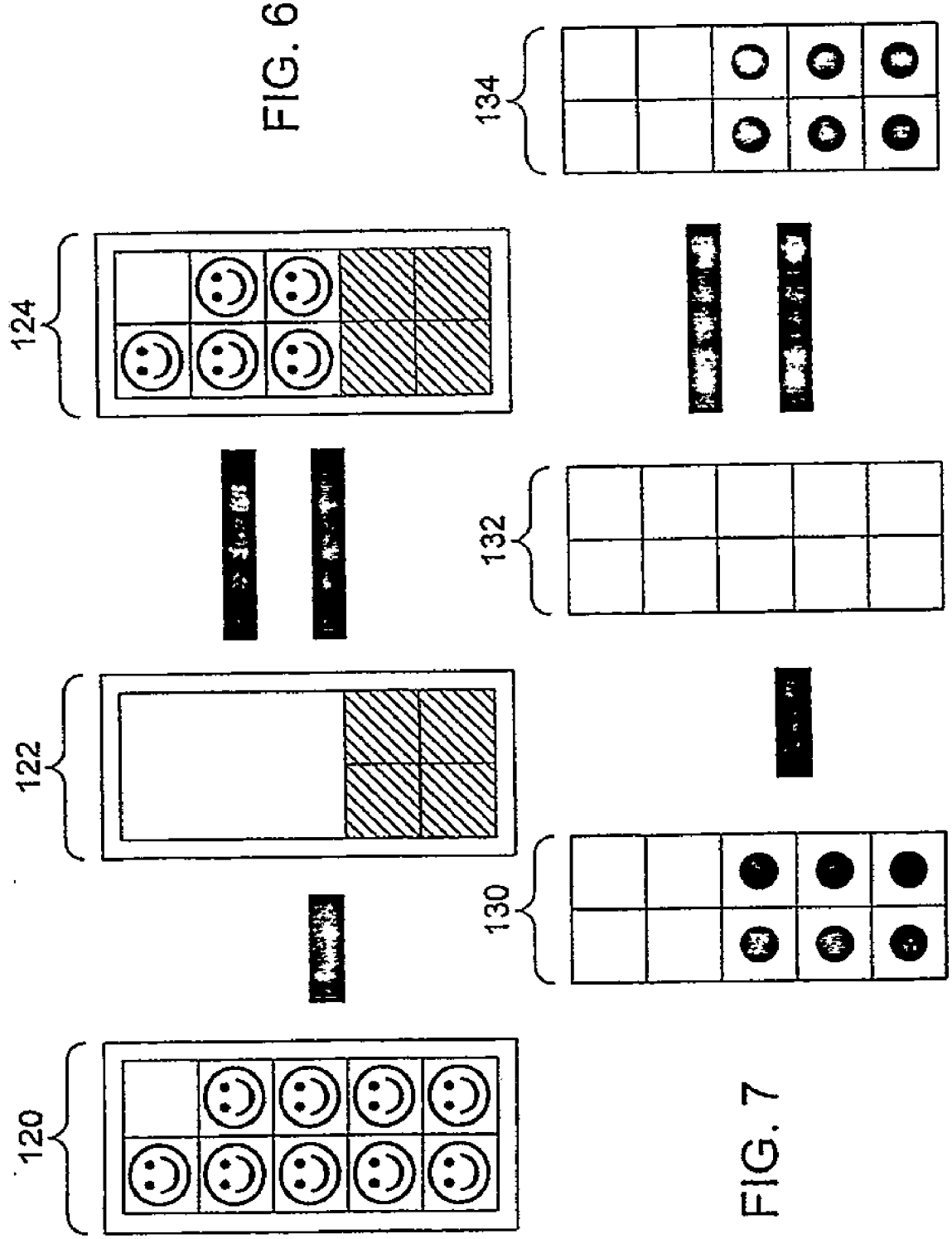
FIG. 6 is a front view of the equation "9–4=5" being represented by a 9 card of a ten-frame dot card system, a 4 cut-out tile of a ten-frame subtraction system of the present invention, and the 4 tile overlapping the 9 card to show five (5) non-crossed-out smiley face dots.
FIG. 7 is a front view of the equation "6–0=6" being represented by a 6 card of a ten-frame dot card system, a 0 tile of a ten-frame subtraction system of the present invention, and the 0 tile overlapping the 6 card to show six (6) non-crossed-out dots.
Figure 12:
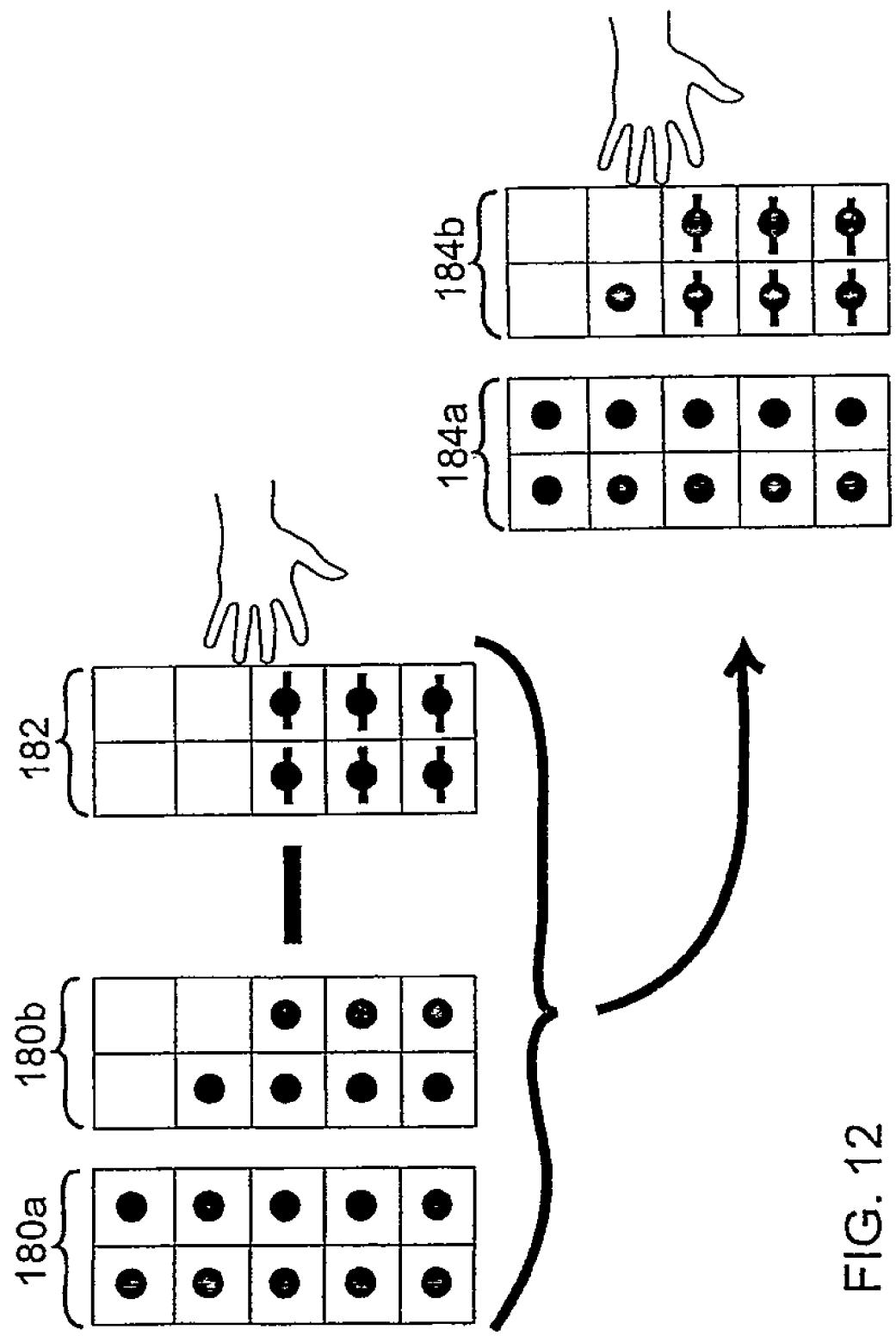

FIG. 6 is a front view of the equation "9–4=5" being represented by a 9 card 120 of a ten-frame dot card system, a 4 cut-out tile 122 of a ten-frame subtraction system of the present invention, and the 4 tile overlapping the 9 card (shown in combination as 124) to show five (5) non-crossed-out smiley face dots. FIG. 6 uses an alternative type of tile 110 in which the tile 110 is a cut-out. The number represented by the tile 110 is left in place with the remainder of the tile 110 (except for a frame) removed. As shown in FIG. 6, therefore, the number 4 tile would be made by removing six (6) windows (also called frames or spaces) from the tile 110. The remaining four (4) windows would not be see-through. To use this alternative tile, the user would first select the 9 card 120. Then, the user would select the alternative subtract 4 tile 122. Placing the subtract 4 tile 122 over the 9 card 120, the user would see only five (5) smiley face dots because the four (4) spaces remaining in the 4 tile 122 would cover four (4) of the smiley face dots on the 9 card 120. By seeing the total of five (5) non-crossed-out smiley face dots when the tile 122 overlaps the card 120 (shown in combination as 124), the user would be able to solve the subtraction problem without laborious counting.

FIG. 7 shows the equation "6–0=6" being represented by a 6 card 130 of a ten-frame dot card system, a 0 tile 132 of a ten-frame subtraction system of the present invention, and the 0 tile overlapping the 6 card (shown in combination as 134) to show six (6) non-crossed-out dots. FIG. 7 shows the process by which a user would implement the invention to solve the subtraction problem "6–0=6." First, the user would select the 6 card 130. Then, the user would select the subtract 0 tile 132. Placing the subtract 0 tile 132 over the 6 card 130, the user would see that six (6) dots do not have a cross-out over them. By seeing the total of six (6) non-crossed-out dots when the tile 132 overlaps the card 130 (shown in combination as 134), the user would be able to solve the subtraction problem without laborious counting.

Figure 8:
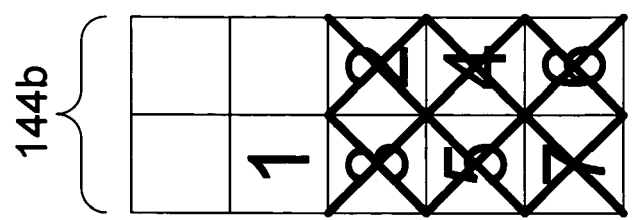
FIG. 8 is a front view of the equation "17–6=11" being represented by a 10 card and a 7 card of a ten-frame dot card system, a 6 tile of a ten-frame subtraction system of the present invention, and the 6 tile overlapping the 7 card to show eleven (11) non-crossed-out numerical dots.
Figure 8:
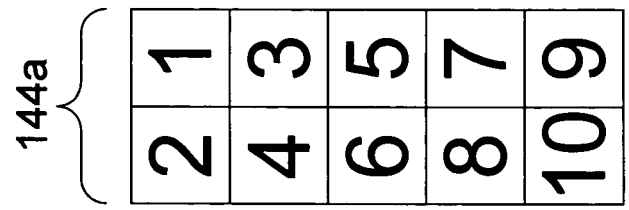
Figure 8:
Figure 8:
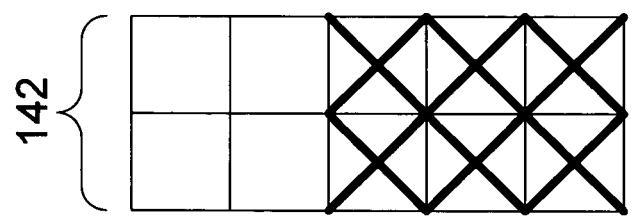
Figure 8:
Figure 8:
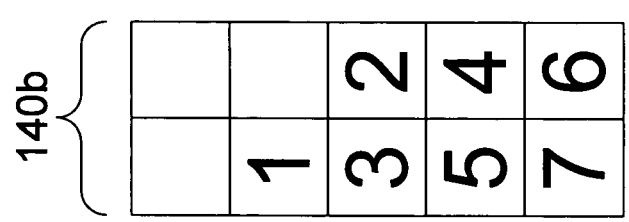
Figure 8:
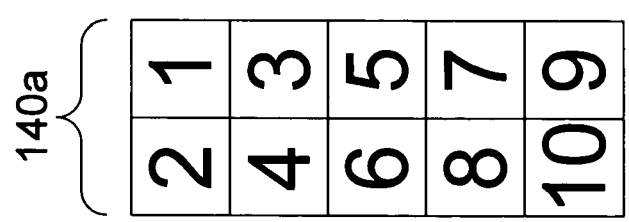

FIG. 8 shows the equation "17–6=11" being represented by a 10 card 140a and a 7 card 140b of a ten-frame dot card system, a 6 tile 142 of a ten-frame subtraction system of the present invention, and the 6 tile 142 overlapping the 7 card 140*b* (shown in combination as 144*a* and 144*b*) to show eleven (11) non-crossed-out numerical dots. FIG. 8 shows the process by which a user would implement the invention to solve the subtraction problem "17−6=11." First, the user would select the 10 card 140*a* and the 7 card 140*b* (for a total of seventeen (17)). Then, the user would select the subtract 6 tile 142. Placing the subtract 6 tile 142 over the 7 card 140*b*, the user would see that one (1) numerical dot on the overlapping tile/card 144*b* and ten (10) numerical dots on the 10 card 140*a* do not have a cross-out over them. By seeing the total of eleven (11) non-crossed-out numerical dots when the 6 tile 142 overlaps the 10 card 140*a* and the 7 card 140*b* (shown in combination as 144*a* and 144*b*), the user would be able to solve the subtraction problem without laborious counting. It should be noted that one feature of the use of numerical dots is that the highest number shown on the card is the value of the card. Another feature is that the highest number on the card not crossed out by an overlapping tile is the number of "dots" remaining on the combined card/tile.

Figure 9:
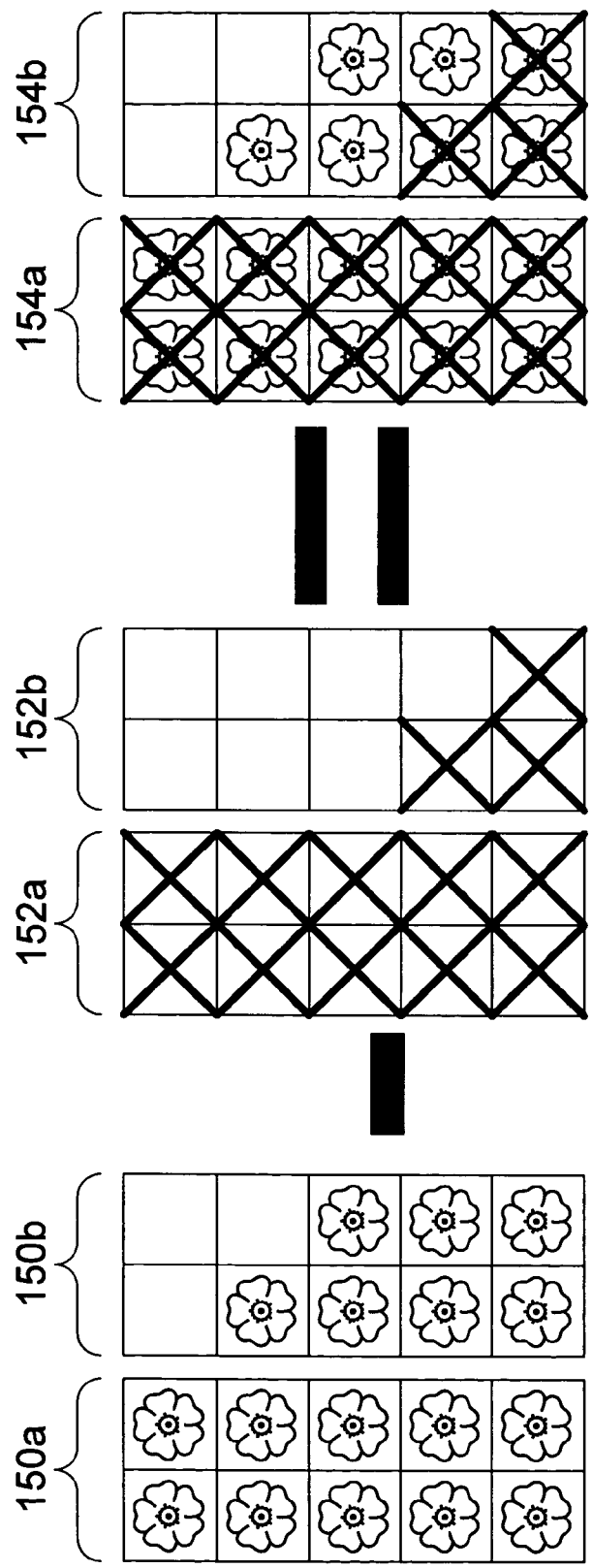
FIG. 9 is a front view of the equation "17–13=4" being represented by a 10 card and a 7 card of a ten-frame dot card system, a 10 tile and a 3 tile of a ten-frame subtraction system of the present invention, and the 10 tile overlapping the 10 card and the 3 tile overlapping the 7 card to show four (4) non-crossed-out flower dots.

FIG. 9 shows the equation "17−13=4" being represented by a 10 card 150*a* and a 7 card 150*b* of a ten-frame dot card system, a 10 tile 152*a* and a 3 tile 152*b* of a ten-frame subtraction system of the present invention, and the 10 tile 152*b* overlapping the 10 card 150*a* (shown in combination as 154*a*) and the 3 tile 152*b* overlapping the 7 card 150*b* (shown in combination as 154*b*) to show four (4) non-crossed-out flower dots. FIG. 9 shows the process by which a user would implement the invention to solve the subtraction problem "17−13=4." First, the user would select the 10 card 150*a* and the 7 card 150*b* (for a total of seventeen (17)). Then, the user would select the subtract 10 tile 152*a* and the subtract 3 tile 152*b*. Placing the subtract 3 tile 152*b* over the 7 card 150*b*, the user would see that four (4) flower dots on the overlapping tile/card 154*b* do not have a cross-out over them. Placing the subtract 10 tile 152*a* over the 10 card 150*a*, the user would see zero (0) flower dots on the overlapping tile/card 154*a* do not have a cross-out over them. By seeing the total of four (4) non-crossed-out flower dots when the 10 tile 152*a* overlaps the 10 card 150*a* and the 3 tile 152*b* overlaps the 7 card 150*b* (shown in combination as 154*a* and 154*b*), the user would be able to solve the subtraction problem without laborious counting.

Figure 10:
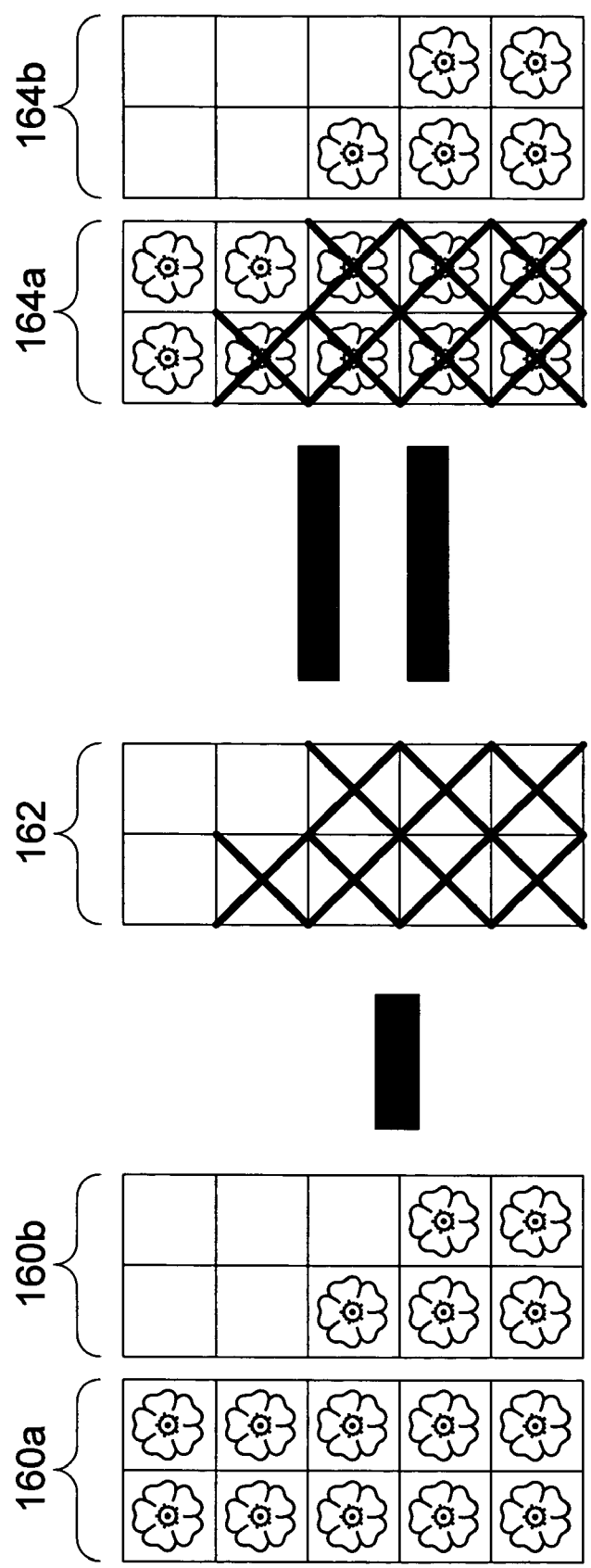
FIG. 10 is a front view of the equation "15–7=8" being represented by a 10 card and a 5 card of a ten-frame dot card system, a 7 tile of a ten-frame subtraction system of the present invention, and the 7 tile overlapping the 10 card to show eight (8) non-crossed-out flower dots.

FIG. 10 shows the equation "15−7=8" being represented by a 10 card 160*a* and a 5 card 160*b* of a ten-frame dot card system, a 7 tile 162 of a ten-frame subtraction system of the present invention, and the 7 tile 162 overlapping the 10 card 160*a* (shown in combination as 164*a*) to show eight (8) non-crossed-out flower dots. FIG. 10 shows the process by which a user would implement the invention to solve the subtraction problem "15−7=8." First, the user would select the 10 card 160*a* and the 5 card 160*b* (for a total of fifteen (15)). Then, the user would select the subtract 7 tile 162. Placing the subtract 7 tile 162 over the 10 card 160*a*, the user would see that three (3) flower dots on the overlapping tile/card 164*a* and five (5) flower dots on the 5 card 160*b*/164*b* do not have a cross-out over them. By seeing the total of eight (8) non-crossed-out flower dots when the 7 tile 162 overlaps the 10 card 160*a* and the 5 card 160*b* (shown in combination as 164*a* and 164*b*), the user would be able to solve the subtraction problem without laborious counting.

Figure 11:
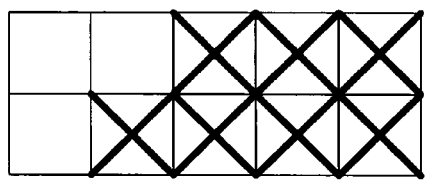
FIG. 11 is a front view of the equation "22–7=15" being represented by two (2) 10 cards and a 2 card of a ten-frame dot card system, a 7 tile of a ten-frame subtraction system of the present invention, and the 7 tile overlapping one of the 10 cards to show fifteen (15) non-crossed-out flower dots.
Figure 11:
Figure 11:
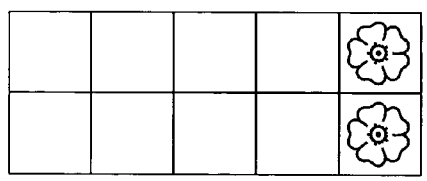
Figure 11:
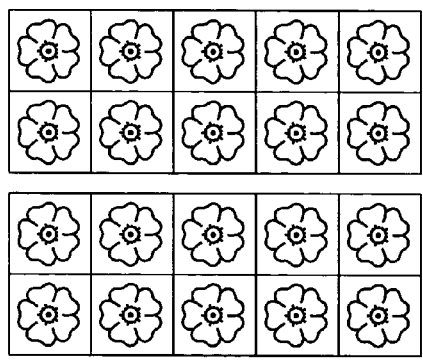
Figure 11:
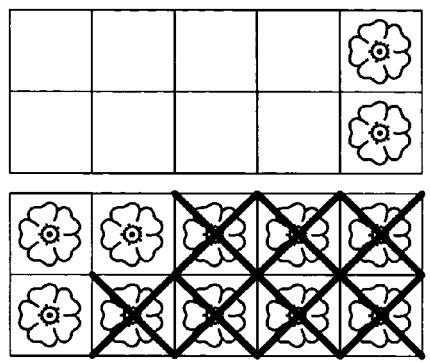
Figure 11:
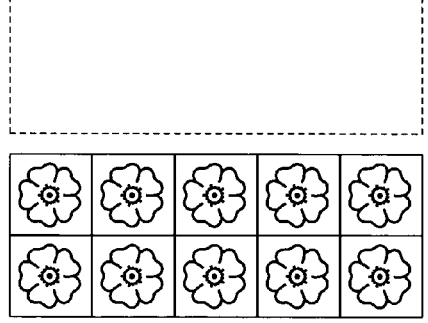
Figure 11:

FIG. 11 shows the equation "22−7=15" being represented by two (2) 10 cards 170*a* and a 2 card 170*b* of a ten-frame dot card system, a 7 tile 172 of a ten-frame subtraction system of the present invention, and the 7 tile 172 overlapping one of the 10 cards 170*a* (shown in combination in the "ones" as 174*b*) to show fifteen (15) non-crossed-out flower dots. FIG. 11 shows the process by which a user would implement the invention to solve the subtraction problem "22−7=15." First, the user would select two 10 cards (shown grouped together as tens 170*a*) and a 2 card (shown in the ones 170*b*) for a total of twenty-two (22) flower dots. Then, the user would select the subtract 7 tile (shown in the ones 172). Because there are more flower dots on the ones tile 172 than there are on the ones card 170*b*, one of the tens cards 170*a* is moved into the ones 174*b* grouping to allow for a solution. This graphically shows borrowing from the "tens column" that a student would do in a traditional subtraction problem. Placing the subtract 7 tile 172 over the 10 card that has been moved into the ones group 174*b*, the user would see that three (3) flower dots on the overlapping tile/card 174*b* and two (2) flower dots on the 2 card 170*b*/174*b* do not have a cross-out over them. By seeing the total of fifteen (15) non-crossed-out flower dots, the user would be able to solve the subtraction problem without laborious counting.

FIG. 12 shows the equation "17−6=11" being represented by a 10 card 180*a* and a 7 card 180*b* of a ten-frame dot card system, a 6 tile 182 of a ten-frame subtraction system of the present invention, and the 6 tile 182 overlapping the 7 card 180*b* (shown in combination as 184*a* and 184*b*) to show eleven (11) non-crossed-out dots. FIG. 12 has been included to graphically show that the present invention is preferably used to solve subtraction problems (such as those shown and described above) by physically moving the tile or tiles to cover or overlap the card or cards.

The arrangement of the dots 102 and cross-outs 112 is meant to be exemplary and not to limit the scope of the invention. The shown two-by-two arrays help children to visualize the numerical relationship, but other arrangements could work equally well. For example, the relationship could be similar to a four-row triangle having a first row of 1 dot 102/cross-out, a second row of 2 dots 102/cross-outs 112, a third row of 3 dots 102/cross-outs 112, and a fourth row of 4 dots 102/cross-outs 112 (similar to the arrangement of bowling pins). Another arrangement might have three (3) rows, the rows arranged as a top row of three (3) dots 102/cross-outs 112, a middle row of four (4) dots 102/cross-outs 112, and a bottom row of three (3) dots 102/cross-outs 112, respectively. Yet another arrangement might be a single row of 10 dots 102/cross-outs 112.

It should be noted that although the invention is discussed in terms of having individual cards 100 and tiles 110, the individual cards 100 and tiles 110 may be replaced with a single card 100 or tile, respectively. For example, a single card 100 might have all the numbers 0–10 in two-by-two arrays of "dots 102" represented thereon. Then, individual take-away tiles 110 could be placed on top of the desired number representation on the single card 100.

In one preferred embodiment of the system, a carrier may be used. The carrier preferably has numbered pockets for each number 0–10 in which the tiles 110 may be sorted and stored. If the system includes a carrier, multiple tiles 110 representing the same number could be stored in the pocket imprinted with the corresponding numeral.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A ten-frame subtraction system for teaching subtraction skills, said system comprising:
   (a) at least one card having a positive numerical representation thereon represented by a corresponding quantity of graphical representations, said graphical representations arranged in a predetermined arrangement;
   (b) at least one tile having a negative numerical representation thereon represented by a corresponding quantity of cross-outs, said cross-outs arranged in said predetermined arrangement;
   (c) said at least one tile for interacting with said at least one card for teaching subtraction skills; and
   (d) said graphical representations remaining visible through said tile if not covered by said cross-outs when said at least one tile interacts with said at least one card.

2. The system of claim 1 wherein said cross-outs are from the group consisting of:
   (a) an "X" cross-out;
   (b) a graphical representation with a "X" cross-out;
   (c) a single "/" cross-out;
   (d) a graphical representation with a single "/" cross-out;
   (e) an "X" cross-out with a circle around the "X";
   (f) a plurality of diagonal lines;
   (g) a single vertical line;
   (h) a graphical representation with a single vertical line;
   (i) a horizontal line cross-out;
   (j) a graphical representation with a horizontal line cross-out;
   (k) a completely opaque covering; and
   (l) a secondary colored covering.

3. The system of claim 1 wherein each said graphical representation is a graphical representation selected from the group consisting of:
   (a) a round dot;
   (b) a star;
   (c) a smiley face;
   (d) a number; and
   (e) a flower.

4. A ten-frame subtraction system for teaching subtraction skills, said system comprising:
   (a) at least one card having a positive numerical representation thereon represented by a corresponding quantity of graphical representations, said graphical representations arranged in a predetermined arrangement;
   (b) at least one tile having a negative numerical representation thereon represented by a corresponding quantity of cross-outs, said cross-outs arranged in said predetermined arrangement;
   (c) said at least one tile for interacting with said at least one card for teaching subtraction skills; and
   (d) wherein said at least one tile is a see-through tile, said graphical representations remaining visible through said tile if not covered by said cross-outs.

5. The system of claim 4 wherein said cross-outs are from the group consisting of:
   (a) an "X" cross-out;
   (b) a graphical representation with a "X" cross-out;
   (c) a single "/" cross-out;
   (d) a graphical representation with a single "/" cross-out;
   (e) an "X" cross-out with a circle around the "X";
   (f) a plurality of diagonal lines;
   (g) a single vertical line;
   (h) a graphical representation with a single vertical line;
   (i) a horizontal line cross-out;
   (j) a graphical representation with a horizontal line cross-out;
   (k) a completely opaque covering; and
   (l) a secondary colored covering.

6. The system of claim 4 wherein each said graphical representation is a graphical representation selected from the group consisting of:
   (a) a round dot;
   (b) a star;
   (c) a smiley face;
   (d) a number; and
   (e) a flower.

7. A ten-frame subtraction system for teaching subtraction skills, said system comprising:
   (a) at least one card having a positive numerical representation thereon represented by a corresponding quantity of graphical representations, said graphical representations arranged in a predetermined arrangement;
   (b) at least one tile having a negative numerical representation thereon represented by a corresponding quantity of cross-outs, said cross-outs arranged in said predetermined arrangement;
   (c) said at least one tile for interacting with said at least one card for teaching subtraction skills; and
   (d) wherein said at least one tile is at least partially transparent.

8. The system of claim 7 wherein said cross-outs are from the group consisting of:
   (a) an "X" cross-out;
   (b) a graphical representation with a "X" cross-out;
   (c) a single "/" cross-out;
   (d) a graphical representation with a single "/" cross-out;
   (e) an "X" cross-out with a circle around the "X";
   (f) a plurality of diagonal lines;
   (g) a single vertical line;
   (h) a graphical representation with a single vertical line;
   (i) a horizontal line cross-out;
   (j) a graphical representation with a horizontal line cross-out;
   (k) a completely opaque covering; and
   (l) a secondary colored covering.

9. The system of claim 7 wherein each said graphical representation is a graphical representation selected from the group consisting of:
   (a) a round dot;
   (b) a star;
   (c) a smiley face;
   (d) a number; and
   (e) a flower.

10. A ten-frame subtraction system for teaching subtraction skills, said system comprising:
    (a) at least one card having a positive numerical representation thereon represented by a corresponding quantity of graphical representations, said graphical representations arranged in a predetermined arrangement;
    (b) at least one tile having a negative numerical representation thereon represented by a corresponding quantity of cross-outs, said cross-outs arranged in said predetermined arrangement;
    (c) said at least one tile for interacting with said at least one card for teaching subtraction skills; and
    (d) wherein said graphical representations arranged in a predetermined arrangement are framed in individual windows and said cross-outs arranged in said predetermined arrangement are framed in individual windows.

11. The system of claim 10 wherein said cross-outs are from the group consisting of:
    (a) an "X" cross-out;

(b) a graphical representation with a "X" cross-out;
(c) a single "/" cross-out;
(d) a graphical representation with a single "/" cross-out;
(e) an "X" cross-out with a circle around the "X";
(f) a plurality of diagonal lines;
(g) a single vertical line;
(h) a graphical representation with a single vertical line;
(i) a horizontal line cross-out;
(j) a graphical representation with a horizontal line cross-out;
(k) a completely opaque covering; and
(l) a secondary colored covering.

12. The system of claim 10 wherein each said graphical representation is a graphical representation selected from the group consisting of:
   (a) a round dot;
   (b) a star;
   (c) a smiley face;
   (d) a number; and
   (e) a flower.

13. A ten-frame subtraction system for teaching subtraction skills, said system comprising:
   (a) a plurality of cards, each card having a numerical representation thereon represented by a corresponding quantity of dots, said dots arranged in a predetermined arrangement;
   (b) a plurality of tiles, each tile having a numerical representation thereon represented by a corresponding quantity of cross-outs, said cross-outs arranged in said predetermined arrangement;
   (c) said plurality of tiles for interacting with said plurality of cards for teaching subtraction skills; and
   (d) said graphical representations remaining visible through said tile if not covered by said cross-outs when said at least one tile interacts with said at least one card.

14. The system of claim 13 wherein said cross-outs are from the group consisting of:
   (a) an "X" cross-out;
   (b) a graphical representation with a "X" cross-out;
   (c) a single "/" cross-out;
   (d) a graphical representation with a single "/" cross-out;
   (e) an "X" cross-out with a circle around the "X";
   (f) a plurality of diagonal lines;
   (g) a single vertical line;
   (h) a graphical representation with a single vertical line;
   (i) a horizontal line cross-out;
   (j) a graphical representation with a horizontal line cross-out;
   (k) a completely opaque covering; and
   (l) a secondary colored covering.

15. The system of claim 13 wherein each said graphical representation is a graphical representation selected from the group consisting of:
   (a) a round dot;
   (b) a star;
   (c) a smiley face;
   (d) a number; and
   (e) a flower.

16. A ten-frame subtraction system for teaching subtraction skills, said system comprising:
   (a) a plurality of cards, each card having a numerical representation thereon represented by a corresponding quantity of dots, said dots arranged in a predetermined arrangement;
   (b) a plurality of tiles, each tile having a numerical representation thereon represented by a corresponding quantity of cross-outs, said cross-outs arranged in said predetermined arrangement;
   (c) said plurality of tiles for interacting with said plurality of cards for teaching subtraction skills; and
   (d) wherein said plurality of tiles are see-through tiles, said dots remaining visible through said tile if not covered by said cross-outs.

17. The system of claim 16 wherein said cross-outs are from the group consisting of:
   (a) an "X" cross-out;
   (b) a graphical representation with a "X" cross-out;
   (c) a single "/" cross-out;
   (d) a graphical representation with a single "/" cross-out;
   (e) an "X" cross-out with a circle around the "X";
   (f) a plurality of diagonal lines;
   (g) a single vertical line;
   (h) a graphical representation with a single vertical line;
   (i) a horizontal line cross-out;
   (j) a graphical representation with a horizontal line cross-out;
   (k) a completely opaque covering; and
   (l) a secondary colored covering.

18. The system of claim 16 wherein each said graphical representation is a graphical representation selected from the group consisting of:
   (a) a round dot;
   (b) a star;
   (c) a smiley face;
   (d) a number; and
   (e) a flower.

19. A ten-frame subtraction system for teaching subtraction skills, said system comprising:
   (a) a plurality of cards, each card having a numerical representation thereon represented by a corresponding quantity of dots, said dots arranged in a predetermined arrangement;
   (b) a plurality of tiles, each tile having a numerical representation thereon represented by a corresponding quantity of cross-outs, said cross-outs arranged in said predetermined arrangement;
   (c) said plurality of tiles for interacting with said plurality of cards for teaching subtraction skills; and
   (d) wherein said plurality of tiles are at least partially transparent.

20. The system of claim 19 wherein said cross-outs are from the group consisting of:
   (a) an "X" cross-out;
   (b) a graphical representation with a "X" cross-out;
   (c) a single "/" cross-out;
   (d) a graphical representation with a single "/" cross-out;
   (e) an "X" cross-out with a circle around the "X";
   (f) a plurality of diagonal lines;
   (g) a single vertical line;
   (h) a graphical representation with a single vertical line;
   (i) a horizontal line cross-out;
   (j) a graphical representation with a horizontal line cross-out;
   (k) a completely opaque covering; and
   (l) a secondary colored covering.

21. The system of claim 19 wherein each said graphical representation is a graphical representation selected from the group consisting of:
   (a) a round dot;
   (b) a star;
   (c) a smiley face;
   (d) a number; and
   (e) a flower.

22. A ten-frame subtraction system for teaching subtraction skills, said system comprising:
(a) a plurality of cards, each card having a numerical representation thereon represented by a corresponding quantity of dots, said dots arranged in a predetermined arrangement;
(b) a plurality of tiles, each tile having a numerical representation thereon represented by a corresponding quantity of cross-outs, said cross-outs arranged in said predetermined arrangement;
(c) said plurality of tiles for interacting with said plurality of cards for teaching subtraction skills; and
(d) wherein said dots arranged in a predetermined arrangement are framed in individual windows and said cross-outs arranged in said predetermined arrangement are framed in individual windows.

23. The system of claim 22 wherein said cross-outs are from the group consisting of:
(a) an "X" cross-out;
(b) a graphical representation with a "X" cross-out;
(c) a single "/" cross-out;
(d) a graphical representation with a single "/" cross-out;
(e) an "X" cross-out with a circle around the "X";
(f) a plurality of diagonal lines;
(g) a single vertical line;
(h) a graphical representation with a single vertical line;
(i) a horizontal line cross-out;
(j) a graphical representation with a horizontal line cross-out;
(k) a completely opaque covering; and
(l) a secondary colored covering.

24. The system of claim 22 wherein each said graphical representation is a graphical representation selected from the group consisting of:
(a) a round dot;
(b) a star;
(c) a smiley face;
(d) a number; and
(e) a flower.

* * * * *

UNITED STATES PATENT AND TRADEMARK OFFICE
CERTIFICATE OF CORRECTION

| | | |
|---|---|---|
| PATENT NO. | : 7,052,279 B1 | |
| APPLICATION NO. | : 10/721601 | |
| DATED | : May 30, 2006 | |
| INVENTOR(S) | : Christine Saal Losq | |

It is certified that error appears in the above-identified patent and that said Letters Patent is hereby corrected as shown below:

<u>In The Drawings</u>
The following Figures Replace Figs. 1, 6, 7 & 12 as shown on the attached sheets.

<u>Column 2,</u>
Line 36, "easy to loose a" should be --easy to lose a--;
Line 42, "to completely erased" should be --to completely erase--;
Line 44, "wipable" should be --wipeable--; and
Line 51, "surface it touch touches" should be --surface it touches--.

<u>Column 4,</u>
Line 45, "number 0-10" should be --numbers 0-10--; and
Line 63, "cards 100 itself" should be --cards 100 themselves--.

<u>Column 5,</u>
Line 23, "in one hand a tile" should be --in one hand and a tile--;
Line 25, "relationship the card" should be --relationship with the card--.

Signed and Sealed this

Sixteenth Day of October, 2007

JON W. DUDAS
*Director of the United States Patent and Trademark Office*